US008996470B1

(12) United States Patent
Hogue et al.

(10) Patent No.: US 8,996,470 B1
(45) Date of Patent: Mar. 31, 2015

(54) SYSTEM FOR ENSURING THE INTERNAL CONSISTENCY OF A FACT REPOSITORY

(75) Inventors: Andrew William Hogue, Pompton Lakes, NJ (US); Robert Joseph Siemborski, Mountain View, CA (US); Jonathan T. Betz, Summit, NJ (US)

(73) Assignee: Google Inc., Mountain View, CA (US)

( * ) Notice: Subject to any disclaimer, the term of this patent is extended or adjusted under 35 U.S.C. 154(b) by 1120 days.

(21) Appl. No.: 11/142,748

(22) Filed: May 31, 2005

(51) Int. Cl.
*G06F 17/30* (2006.01)
*G06F 11/28* (2006.01)

(52) U.S. Cl.
CPC .................................. *G06F 11/28* (2013.01)
USPC ............................. 707/687; 707/692; 707/696

(58) Field of Classification Search
USPC ................... 707/2, 3, 4, 5, 10, 201, 203, 204
See application file for complete search history.

(56) References Cited

U.S. PATENT DOCUMENTS

| 5,010,478 A | | 4/1991 | Deran ............................ 364/200 |
| 5,133,075 A | * | 7/1992 | Risch ............................ 707/201 |
| 5,347,653 A | * | 9/1994 | Flynn et al. ................... 707/695 |
| 5,440,730 A | | 8/1995 | Elmasri et al. ................ 395/600 |
| 5,475,819 A | | 12/1995 | Miller et al. ............. 395/200.03 |
| 5,519,608 A | | 5/1996 | Kupiec .................... 364/419.08 |
| 5,546,507 A | | 8/1996 | Staub |
| 5,560,005 A | | 9/1996 | Hoover et al. ................ 395/600 |
| 5,574,898 A | | 11/1996 | Leblang et al. ............... 395/601 |
| 5,675,785 A | | 10/1997 | Hall et al. |
| 5,680,622 A | | 10/1997 | Even ............................ 395/709 |
| 5,694,590 A | * | 12/1997 | Thuraisingham et al. ........ 707/9 |
| 5,701,470 A | * | 12/1997 | Joy et al. ....................... 707/692 |
| 5,717,911 A | * | 2/1998 | Madrid et al. ................... 707/2 |
| 5,717,951 A | | 2/1998 | Yabumoto ..................... 395/831 |
| 5,724,571 A | | 3/1998 | Woods |
| 5,778,373 A | | 7/1998 | Levy et al. |
| 5,778,378 A | | 7/1998 | Rubin ............................ 707/103 |
| 5,787,413 A | * | 7/1998 | Kauffman et al. ................ 707/2 |
| 5,793,966 A | * | 8/1998 | Amstein et al. ................ 709/203 |
| 5,802,299 A | | 9/1998 | Logan et al. ............. 395/200.48 |
| 5,815,415 A | | 9/1998 | Bentley et al. ................. 364/578 |
| 5,819,210 A | * | 10/1998 | Maxwell et al. ................... 704/9 |
| 5,819,265 A | | 10/1998 | Ravin et al. ...................... 707/5 |

(Continued)

FOREIGN PATENT DOCUMENTS

| JP | 5-174020 A | 7/1993 | ............ G06F 17/21 |
| JP | 11-265400 A | 9/1999 | |

(Continued)

OTHER PUBLICATIONS

Wirzenius, Lars, "C Preprocessor Trick for Implementing Similar Data Types", Jan. 17, 2000, pp. 1-9.*

(Continued)

*Primary Examiner* — Mohammad S Rostami
(74) *Attorney, Agent, or Firm* — Morgan, Lewis & Bockius LLP

(57) ABSTRACT

Methods and systems for maintaining the internal consistency of a fact repository are described. Accessed objects are checked for attribute-value pairs that have links to other objects. For any link to an object, the name of the linked-to object is inserted into the attribute-value pair having the link. The accessed objects are filtered to remove attribute-value pairs meeting predefined criteria, possibly resulting in null objects. Links to null objects are identified and removed.

20 Claims, 5 Drawing Sheets

(56) References Cited

U.S. PATENT DOCUMENTS

| | | | |
|---|---|---|---|
| 5,822,743 A | 10/1998 | Gupta et al. | 706/50 |
| 5,826,258 A | 10/1998 | Gupta et al. | 707/4 |
| 5,838,979 A | 11/1998 | Hart et al. | |
| 5,909,689 A | 6/1999 | Van Ryzin | 707/203 |
| 5,920,859 A | 7/1999 | Li | 707/5 |
| 5,943,670 A | 8/1999 | Prager | 707/5 |
| 5,956,718 A * | 9/1999 | Prasad et al. | 707/10 |
| 5,974,254 A | 10/1999 | Hsu | 395/703 |
| 5,987,460 A | 11/1999 | Niwa et al. | 707/6 |
| 6,006,221 A | 12/1999 | Liddy et al. | |
| 6,018,741 A * | 1/2000 | Howland et al. | 707/696 |
| 6,038,560 A | 3/2000 | Wical | |
| 6,044,366 A | 3/2000 | Graffe et al. | 707/2 |
| 6,052,693 A | 4/2000 | Smith et al. | 707/104 |
| 6,064,952 A | 5/2000 | Imanaka et al. | |
| 6,073,130 A | 6/2000 | Jacobson et al. | |
| 6,078,918 A | 6/2000 | Allen et al. | 707/6 |
| 6,112,203 A | 8/2000 | Bharat et al. | 707/5 |
| 6,112,210 A * | 8/2000 | Nori et al. | 1/1 |
| 6,122,647 A | 9/2000 | Horowitz et al. | 707/513 |
| 6,134,555 A | 10/2000 | Chadha et al. | 707/102 |
| 6,138,270 A | 10/2000 | Hsu | 717/3 |
| 6,182,063 B1 | 1/2001 | Woods | |
| 6,202,065 B1 | 3/2001 | Wills | |
| 6,212,526 B1 | 4/2001 | Chaudhuri et al. | 707/102 |
| 6,240,546 B1 | 5/2001 | Lee et al. | 717/4 |
| 6,263,328 B1 | 7/2001 | Coden et al. | 707/3 |
| 6,263,358 B1 | 7/2001 | Lee et al. | |
| 6,266,805 B1 | 7/2001 | Nwana et al. | |
| 6,285,999 B1 | 9/2001 | Page | 707/5 |
| 6,289,338 B1 | 9/2001 | Stoffel et al. | 707/3 |
| 6,311,194 B1 | 10/2001 | Sheth et al. | 707/505 |
| 6,314,555 B1 | 11/2001 | Ndumu et al. | |
| 6,327,574 B1 | 12/2001 | Kramer et al. | 705/14 |
| 6,349,275 B1 | 2/2002 | Schumacher et al. | 704/8 |
| 6,377,943 B1 | 4/2002 | Jakobsson | 707/2 |
| 6,397,228 B1 * | 5/2002 | Lamburt et al. | 707/692 |
| 6,438,543 B1 | 8/2002 | Kazi et al. | |
| 6,470,330 B1 | 10/2002 | Das et al. | |
| 6,473,898 B1 | 10/2002 | Waugh et al. | 717/168 |
| 6,487,495 B1 | 11/2002 | Gale et al. | |
| 6,502,102 B1 | 12/2002 | Haswell et al. | 707/102 |
| 6,519,631 B1 | 2/2003 | Rosenschein et al. | |
| 6,556,991 B1 | 4/2003 | Borkovsky | 707/6 |
| 6,565,610 B1 | 5/2003 | Wang et al. | |
| 6,567,846 B1 | 5/2003 | Garg et al. | |
| 6,567,936 B1 | 5/2003 | Yang et al. | 714/37 |
| 6,572,661 B1 | 6/2003 | Stern | 715/501.1 |
| 6,578,032 B1 | 6/2003 | Chandrasekar et al. | |
| 6,584,464 B1 | 6/2003 | Warthen | 707/4 |
| 6,584,646 B2 | 7/2003 | Fujita | |
| 6,594,658 B2 | 7/2003 | Woods | |
| 6,606,625 B1 | 8/2003 | Muslea et al. | 707/6 |
| 6,606,659 B1 | 8/2003 | Hegli et al. | 709/225 |
| 6,609,123 B1 | 8/2003 | Cazemier et al. | 7/4 |
| 6,636,742 B1 | 10/2003 | Torkki et al. | |
| 6,643,641 B1 | 11/2003 | Snyder | |
| 6,656,991 B2 | 12/2003 | Staccione et al. | 524/430 |
| 6,665,659 B1 | 12/2003 | Logan | 707/3 |
| 6,665,666 B1 | 12/2003 | Brown et al. | 707/5 |
| 6,665,837 B1 | 12/2003 | Dean et al. | 715/501.1 |
| 6,675,159 B1 | 1/2004 | Lin et al. | |
| 6,684,205 B1 | 1/2004 | Modha et al. | |
| 6,693,651 B2 | 2/2004 | Biebesheimer et al. | |
| 6,704,726 B1 | 3/2004 | Amouroux | |
| 6,738,767 B1 | 5/2004 | Chung et al. | |
| 6,745,189 B2 * | 6/2004 | Schreiber | 707/696 |
| 6,754,873 B1 | 6/2004 | Law et al. | 715/501.1 |
| 6,763,496 B1 | 7/2004 | Hennings et al. | |
| 6,799,176 B1 | 9/2004 | Page | 707/5 |
| 6,804,667 B1 | 10/2004 | Martin | 707/6 |
| 6,820,081 B1 | 11/2004 | Kawai et al. | 707/7 |
| 6,820,093 B2 | 11/2004 | de la Huerga | |
| 6,823,495 B1 | 11/2004 | Vedula et al. | 715/805 |
| 6,832,218 B1 | 12/2004 | Emens et al. | |
| 6,845,354 B1 | 1/2005 | Kuo et al. | |
| 6,850,896 B1 | 2/2005 | Kelman et al. | 705/10 |
| 6,868,411 B2 | 3/2005 | Shanahan | |
| 6,873,982 B1 | 3/2005 | Bates et al. | |
| 6,873,993 B2 | 3/2005 | Charlesworth et al. | |
| 6,886,005 B2 | 4/2005 | Davis | 707/2 |
| 6,886,010 B2 | 4/2005 | Kostoff | |
| 6,901,403 B1 | 5/2005 | Bata et al. | 707/101 |
| 6,904,429 B2 | 6/2005 | Sako et al. | |
| 6,957,213 B1 | 10/2005 | Yuret | 707/4 |
| 6,963,880 B1 * | 11/2005 | Pingte et al. | 707/103 R |
| 6,965,900 B2 | 11/2005 | Srinivasa et al. | |
| 7,003,506 B1 | 2/2006 | Fisk et al. | |
| 7,003,522 B1 | 2/2006 | Reynar et al. | 707/10 |
| 7,003,719 B1 | 2/2006 | Rosenoff et al. | 715/500.1 |
| 7,007,228 B1 | 2/2006 | Carro | |
| 7,013,308 B1 | 3/2006 | Tunstall-Pedoe | |
| 7,020,662 B2 | 3/2006 | Boreham et al. | 707/104.1 |
| 7,043,521 B2 | 5/2006 | Eitel | |
| 7,051,023 B2 | 5/2006 | Kapur et al. | 707/5 |
| 7,076,491 B2 | 7/2006 | Tsao | |
| 7,080,073 B1 | 7/2006 | Jiang et al. | 707/7 |
| 7,080,085 B1 * | 7/2006 | Choy et al. | 707/101 |
| 7,100,082 B2 | 8/2006 | Little et al. | |
| 7,143,099 B2 | 11/2006 | Lecheler-Moore et al. | 707/101 |
| 7,146,536 B2 | 12/2006 | Bingham, Jr. et al. | 714/26 |
| 7,158,980 B2 | 1/2007 | Shen | |
| 7,162,499 B2 * | 1/2007 | Lees et al. | 707/203 |
| 7,165,024 B2 | 1/2007 | Glover et al. | |
| 7,174,504 B2 | 2/2007 | Tsao | |
| 7,181,471 B1 | 2/2007 | Ibuki et al. | |
| 7,194,380 B2 | 3/2007 | Barrow et al. | 702/181 |
| 7,197,449 B2 | 3/2007 | Hu et al. | 704/9 |
| 7,216,073 B2 | 5/2007 | Lavi et al. | |
| 7,233,943 B2 | 6/2007 | Modha et al. | |
| 7,260,573 B1 | 8/2007 | Jeh et al. | |
| 7,263,565 B2 | 8/2007 | Tawara et al. | |
| 7,277,879 B2 | 10/2007 | Varadarajan | 707/1 |
| 7,302,646 B2 | 11/2007 | Nomiyama et al. | |
| 7,305,380 B1 | 12/2007 | Hoelzle et al. | 707/3 |
| 7,325,160 B2 | 1/2008 | Tsao | |
| 7,363,312 B2 | 4/2008 | Goldsack | 707/102 |
| 7,376,895 B2 | 5/2008 | Tsao | |
| 7,398,461 B1 | 7/2008 | Broder et al. | |
| 7,409,381 B1 | 8/2008 | Steel et al. | |
| 7,412,078 B2 | 8/2008 | Kim | |
| 7,418,736 B2 | 8/2008 | Ghanea-Hercock | |
| 7,472,182 B1 | 12/2008 | Young et al. | 709/224 |
| 7,483,829 B2 | 1/2009 | Murakami et al. | 704/10 |
| 7,493,308 B1 | 2/2009 | Bair, Jr. et al. | |
| 7,493,317 B2 | 2/2009 | Geva | 707/3 |
| 7,587,387 B2 | 9/2009 | Hogue | |
| 7,644,076 B1 | 1/2010 | Ramesh et al. | |
| 7,672,971 B2 | 3/2010 | Betz et al. | |
| 7,685,201 B2 | 3/2010 | Zeng et al. | |
| 7,698,303 B2 | 4/2010 | Goodwin et al. | |
| 7,716,225 B1 | 5/2010 | Dean et al. | |
| 7,747,571 B2 | 6/2010 | Boggs | |
| 7,756,823 B2 | 7/2010 | Young et al. | |
| 7,797,282 B1 * | 9/2010 | Kirshenbaum et al. | 707/651 |
| 7,885,918 B2 | 2/2011 | Statchuk | |
| 7,917,154 B2 | 3/2011 | Fortescue et al. | |
| 7,953,720 B1 | 5/2011 | Rohde et al. | |
| 8,024,281 B2 | 9/2011 | Proctor et al. | |
| 8,065,290 B2 | 11/2011 | Hogue | |
| 8,108,501 B2 | 1/2012 | Birnie et al. | |
| 2001/0021935 A1 | 9/2001 | Mills | |
| 2002/0022956 A1 | 2/2002 | Ukrainczyk et al. | |
| 2002/0038307 A1 | 3/2002 | Obradovic et al. | 707/102 |
| 2002/0042707 A1 | 4/2002 | Zhao et al. | 704/9 |
| 2002/0065845 A1 | 5/2002 | Naito et al. | 707/500.1 |
| 2002/0073115 A1 * | 6/2002 | Davis | 707/500.1 |
| 2002/0083039 A1 | 6/2002 | Ferrari et al. | 707/1 |
| 2002/0087567 A1 | 7/2002 | Spiegler et al. | 707/100 |
| 2002/0107861 A1 | 8/2002 | Clendinning et al. | |
| 2002/0147738 A1 | 10/2002 | Reader | 707/500 |
| 2002/0169770 A1 | 11/2002 | Kim et al. | 707/5 |
| 2002/0174099 A1 | 11/2002 | Raj et al. | |
| 2002/0178448 A1 | 11/2002 | Te Kiefte et al. | 725/46 |

(56) References Cited

U.S. PATENT DOCUMENTS

| | | | |
|---|---|---|---|
| 2002/0194172 A1* | 12/2002 | Schreiber | 707/4 |
| 2003/0018652 A1 | 1/2003 | Heckerman et al. | 707/104.1 |
| 2003/0058706 A1 | 3/2003 | Okamoto et al. | 365/200 |
| 2003/0069880 A1 | 4/2003 | Harrison et al. | |
| 2003/0078902 A1 | 4/2003 | Leong et al. | 706/59 |
| 2003/0088607 A1 | 5/2003 | Ruellan et al. | |
| 2003/0097357 A1 | 5/2003 | Ferrari et al. | |
| 2003/0120644 A1 | 6/2003 | Shirota | 707/3 |
| 2003/0120675 A1 | 6/2003 | Stauber et al. | 707/100 |
| 2003/0126102 A1 | 7/2003 | Borthwick | 706/21 |
| 2003/0126152 A1 | 7/2003 | Rajak | |
| 2003/0149567 A1 | 8/2003 | Schmitz et al. | 704/270 |
| 2003/0149699 A1 | 8/2003 | Tsao | |
| 2003/0154071 A1 | 8/2003 | Shreve | 704/9 |
| 2003/0167163 A1 | 9/2003 | Glover et al. | |
| 2003/0177110 A1 | 9/2003 | Okamoto et al. | 707/3 |
| 2003/0182310 A1 | 9/2003 | Charnock et al. | 707/104.1 |
| 2003/0195872 A1 | 10/2003 | Senn | |
| 2003/0195877 A1 | 10/2003 | Ford et al. | 707/3 |
| 2003/0196052 A1 | 10/2003 | Bolik et al. | 711/162 |
| 2003/0204481 A1 | 10/2003 | Lau | |
| 2003/0208354 A1 | 11/2003 | Lin et al. | |
| 2004/0003067 A1 | 1/2004 | Ferrin | 709/223 |
| 2004/0015481 A1 | 1/2004 | Zinda | |
| 2004/0024739 A1 | 2/2004 | Copperman et al. | 707/1 |
| 2004/0049503 A1 | 3/2004 | Modha et al. | |
| 2004/0059726 A1 | 3/2004 | Hunter et al. | |
| 2004/0064447 A1 | 4/2004 | Simske et al. | 707/5 |
| 2004/0088292 A1 | 5/2004 | Dettinger et al. | 707/4 |
| 2004/0107125 A1 | 6/2004 | Guheen et al. | 705/7 |
| 2004/0122844 A1 | 6/2004 | Malloy et al. | 707/102 |
| 2004/0122846 A1 | 6/2004 | Chess et al. | |
| 2004/0123240 A1 | 6/2004 | Gerstl et al. | 715/513 |
| 2004/0128624 A1 | 7/2004 | Arellano et al. | 715/530 |
| 2004/0143600 A1 | 7/2004 | Musgrove et al. | 707/104.1 |
| 2004/0153456 A1 | 8/2004 | Charnock et al. | 707/10 |
| 2004/0167870 A1 | 8/2004 | Wakefield et al. | 707/1 |
| 2004/0167907 A1 | 8/2004 | Wakefield et al. | |
| 2004/0167911 A1 | 8/2004 | Wakefield et al. | |
| 2004/0177015 A1 | 9/2004 | Galai et al. | 705/35 |
| 2004/0177080 A1 | 9/2004 | Doise et al. | |
| 2004/0199923 A1 | 10/2004 | Russek | 719/310 |
| 2004/0243552 A1 | 12/2004 | Titemore et al. | |
| 2004/0243614 A1 | 12/2004 | Boone et al. | |
| 2004/0255237 A1 | 12/2004 | Tong | 715/501.1 |
| 2004/0260979 A1 | 12/2004 | Kumai | 714/37 |
| 2004/0267700 A1 | 12/2004 | Dumais et al. | 707/2 |
| 2004/0268237 A1 | 12/2004 | Jones et al. | |
| 2005/0055365 A1 | 3/2005 | Ramakrishnan et al. | |
| 2005/0076012 A1 | 4/2005 | Manber et al. | 707/3 |
| 2005/0080613 A1 | 4/2005 | Colledge et al. | |
| 2005/0086211 A1 | 4/2005 | Mayer | 707/3 |
| 2005/0086222 A1 | 4/2005 | Wang et al. | 707/5 |
| 2005/0086251 A1 | 4/2005 | Hatscher et al. | |
| 2005/0097150 A1 | 5/2005 | McKeon et al. | 707/202 |
| 2005/0108630 A1 | 5/2005 | Wasson et al. | |
| 2005/0125311 A1 | 6/2005 | Chidiac et al. | 705/28 |
| 2005/0149576 A1 | 7/2005 | Marmaros et al. | 707/200 |
| 2005/0149851 A1 | 7/2005 | Mittal | 715/501.1 |
| 2005/0187923 A1 | 8/2005 | Cipollone | 707/3 |
| 2005/0188217 A1 | 8/2005 | Ghanea-Hercock | |
| 2005/0240615 A1 | 10/2005 | Barsness et al. | 707/102 |
| 2005/0256825 A1 | 11/2005 | Dettinger et al. | 707/1 |
| 2006/0036504 A1 | 2/2006 | Allocca et al. | 705/26 |
| 2006/0041597 A1 | 2/2006 | Conrad et al. | 707/200 |
| 2006/0047691 A1 | 3/2006 | Humphreys et al. | |
| 2006/0047838 A1 | 3/2006 | Chauhan | 709/230 |
| 2006/0053171 A1 | 3/2006 | Eldridge et al. | 707/203 |
| 2006/0053175 A1 | 3/2006 | Gardner et al. | 707/203 |
| 2006/0064411 A1 | 3/2006 | Gross et al. | |
| 2006/0074824 A1 | 4/2006 | Li | 706/20 |
| 2006/0074910 A1 | 4/2006 | Yun et al. | 707/7 |
| 2006/0085465 A1 | 4/2006 | Nori et al. | 707/101 |
| 2006/0112110 A1 | 5/2006 | Maymir-Ducharme et al. | |
| 2006/0123046 A1 | 6/2006 | Doise et al. | |
| 2006/0129843 A1 | 6/2006 | Srinivasa et al. | |
| 2006/0136585 A1 | 6/2006 | Mayfield et al. | 709/224 |
| 2006/0143227 A1 | 6/2006 | Helm et al. | 707/103 |
| 2006/0143603 A1 | 6/2006 | Kalthoff et al. | 717/172 |
| 2006/0152755 A1 | 7/2006 | Curtis et al. | 358/1.15 |
| 2006/0167991 A1 | 7/2006 | Heikes et al. | |
| 2006/0224582 A1 | 10/2006 | Hogue | |
| 2006/0238919 A1 | 10/2006 | Bradley | 360/128 |
| 2006/0242180 A1 | 10/2006 | Graf et al. | |
| 2006/0248045 A1 | 11/2006 | Toledano et al. | 707/2 |
| 2006/0248456 A1 | 11/2006 | Bender et al. | 715/531 |
| 2006/0253418 A1 | 11/2006 | Charnock et al. | 707/1 |
| 2006/0259462 A1 | 11/2006 | Timmons | |
| 2006/0277169 A1 | 12/2006 | Lunt et al. | |
| 2006/0288268 A1 | 12/2006 | Srinivasan et al. | 715/505 |
| 2006/0293879 A1 | 12/2006 | Zhao et al. | 704/9 |
| 2007/0005593 A1 | 1/2007 | Self et al. | 707/6 |
| 2007/0005639 A1 | 1/2007 | Gaussier et al. | 707/103 R |
| 2007/0016890 A1 | 1/2007 | Brunner et al. | 717/107 |
| 2007/0038610 A1* | 2/2007 | Omoigui | 707/3 |
| 2007/0043708 A1 | 2/2007 | Tunstall-Pedoe | |
| 2007/0055656 A1 | 3/2007 | Tunstall-Pedoe | |
| 2007/0073768 A1 | 3/2007 | Goradia | 707/104.1 |
| 2007/0094246 A1 | 4/2007 | Dill et al. | 707/4 |
| 2007/0100814 A1 | 5/2007 | Lee et al. | |
| 2007/0130123 A1 | 6/2007 | Majumder | 707/3 |
| 2007/0143282 A1 | 6/2007 | Betz et al. | |
| 2007/0143317 A1 | 6/2007 | Hogue et al. | 707/100 |
| 2007/0150800 A1 | 6/2007 | Betz et al. | 715/500 |
| 2007/0198451 A1 | 8/2007 | Kehlenbeck et al. | |
| 2007/0198480 A1 | 8/2007 | Hogue et al. | 707/3 |
| 2007/0198481 A1 | 8/2007 | Hogue et al. | |
| 2007/0198503 A1 | 8/2007 | Hogue et al. | |
| 2007/0198577 A1 | 8/2007 | Betz et al. | |
| 2007/0198598 A1 | 8/2007 | Betz et al. | |
| 2007/0198600 A1 | 8/2007 | Betz | |
| 2007/0203867 A1 | 8/2007 | Hogue et al. | 706/48 |
| 2007/0208773 A1 | 9/2007 | Tsao | |
| 2007/0271268 A1 | 11/2007 | Fontoura et al. | 707/6 |
| 2008/0071739 A1 | 3/2008 | Kumar et al. | 707/3 |
| 2008/0104019 A1 | 5/2008 | Nath | |
| 2009/0006359 A1 | 1/2009 | Liao | 707/5 |
| 2009/0119255 A1 | 5/2009 | Frank et al. | |

FOREIGN PATENT DOCUMENTS

| | | | | |
|---|---|---|---|---|
| JP | 2002-157276 | | 5/2002 | |
| JP | 2002-540506 A | | 11/2002 | |
| JP | 2003-281173 A | | 10/2003 | |
| WO | WO 01/27713 A2 | | 4/2001 | |
| WO | WO 2004/114163 A2 | | 12/2004 | G06F 17/30 |
| WO | WO 2006/104951 A1 | | 10/2006 | G06F 17/30 |

OTHER PUBLICATIONS

Cover, T.M., et al., "Elements of Information Theory," Wiley-InterScience, New York, NY, 1991, pp. 12-23.

Gray, R.M., "Entropy and Information Theory," Springer-Verlag, New York, NY, 1990, pp. 17-46.

MacKay, D.J.C., "Information Theory, Inference and Learning Algorithms," Cambridge University Press, 2003, pp. 22-33, 138-140.

Shannon, C.E., et al., "The Mathematical Theory of Communication," The Bell System Technical Journal, vol. 27, pp. 379-423, 623-656, Jul., Oct. 1948.

Betz, Examiner's Answer, U.S. Appl. No. 11/097,688, Jul. 8, 2010, 18 pgs.

Betz, Examiner's Answer, U.S. Appl. No. 11/394,414, Jan. 24, 2011, 31 pgs.

Betz, Final Office Action, U.S. Appl. No. 11/394,552, Oct. 21, 2013, 22 pgs.

Betz, Notice of Allowance, U.S. Appl. No. 11/097,688, Nov. 19, 2013, 17 pgs.

Betz, Notice of Allowance, U.S. Appl. No. 11/142,740, Apr. 16, 2009, 7 pgs.

Betz, Notice of Allowance, U.S. Appl. No. 11/142,765, Jul. 1, 2010, 14 pgs.

Betz, Notice of Allowance, U.S. Appl. No. 11/341,069, Sep. 8, 2008, 6 pgs.

(56) References Cited

OTHER PUBLICATIONS

Betz, Notice of Allowance, U.S. Appl. No. 11/394,414, Apr. 30, 2014, 12 pgs.
Betz, Notice of Allowance, U.S. Appl. No. 12/939,981, Aug. 11, 2011, 7 pgs.
Betz, Notice of Allowance, U.S. Appl. No. 12/939,981, Apr. 26, 2011, 11 pgs.
Betz, Notice of Allowance, U.S. Appl. No. 13/302,755, Jan. 6, 2014, 9 pgs.
Betz, Notice of Allowance, U.S. Appl. No. 13/302,755, Aug. 28, 2013, 6 pgs.
Betz, Office Action, U.S. Appl. No. 11/097,688, Mar. 18, 2009, 13 pgs.
Betz, Office Action, U.S. Appl. No. 11/097,688, Oct. 28, 2009, 11 pgs.
Betz, Office Action, U.S. Appl. No. 11/142,740, Aug. 13, 2007, 12 pgs.
Betz, Office Action, U.S. Appl. No. 11/142,740, May 17, 2007, 12 pgs.
Betz, Office Action, U.S. Appl. No. 11/142,740, Jul. 23, 2008, 11 pgs.
Betz, Office Action, U.S. Appl. No. 11/142,740, Dec. 26, 2007, 12 pgs.
Betz, Office Action, U.S. Appl. No. 11/142,740, Jan. 27, 2009, 11 pgs.
Betz, Office Action, U.S. Appl. No. 11/142,740, Apr. 30, 2008, 14 pgs.
Betz, Office Action, U.S. Appl. No. 11/142,765, Jan. 8, 2010, 17 pgs.
Betz, Office Action, U.S. Appl. No. 11/142,765, May 9, 2008, 20 pgs.
Betz, Office Action, U.S. Appl. No. 11/142,765, Jan. 17, 2008, 16 pgs.
Betz, Office Action, U.S. Appl. No. 11/142,765, Oct. 17, 2007, 14 pgs.
Betz, Office Action, U.S. Appl. No. 11/142,765, Oct. 17, 2008, 17 pgs.
Betz, Office Action, U.S. Appl. No. 11/142,765, Jun. 18, 2007, 13 pgs.
Betz, Office Action, U.S. Appl. No. 11/142,765, Apr. 28, 2009, 16 pgs.
Betz, Office Action, U.S. Appl. No. 11/341,069, Apr. 1, 2008, 8 pgs.
Betz, Office Action, U.S. Appl. No. 11/394,414, Mar. 5, 2010, 24 pgs.
Betz, Office Action, U.S. Appl. No. 11/394,414, Sep. 15, 2009, 16 pgs.
Betz, Office Action, U.S. Appl. No. 11/394,552, Apr. 1, 2008, 14 pgs.
Betz, Office Action, U.S. Appl. No. 11/394,552, Aug. 4, 2010, 19 pgs.
Betz, Office Action, U.S. Appl. No. 11/394,552, Feb. 8, 2011, 22 pgs.
Betz, Office Action, U.S. Appl. No. 11/394,552, Jul. 8, 2011, 13 pgs.
Betz, Office Action, U.S. Appl. No. 11/394,552, Apr. 11, 2012, 15 pgs.
Betz, Office Action, U.S. Appl. No. 11/394,552, Nov. 12, 2008, 11 pgs.
Betz, Office Action, U.S. Appl. No. 11/394,552, Jan. 13, 2010, 15 pgs.
Betz, Office Action, U.S. Appl. No. 11/394,552, Mar. 13, 2009, 12 pgs.
Betz, Office Action, U.S. Appl. No. 11/394,552, Apr. 23, 2013, 21 pgs.
Betz, Office Action, U.S. Appl. No. 11/394,552, Sep. 24, 2012, 21 pgs.
Betz, Office Action, U.S. Appl. No. 12/939,981, Dec. 9, 2010, 12 pgs.
Betz, Office Action, U.S. Appl. No. 13/302,755, Mar. 25, 2013, 15 pgs.
Dean, Using design recovery techniques to transform legacy systems, 2001, 10 pgs.
Etzioni, Unsupervised named-entity extraction from the web: an experimental study, Feb. 28, 2005, 42 pgs.
Gigablast, Web/Directory, printed Aug. 24, 2010, 1 pg.
Google Inc., International Search Report / Written Opinion, PCT/US2006/010965, Jul. 5, 2006, 4 pgs.
Google Inc., Office Action, CA 2603085, Sep. 18, 2012, 2 pgs.
Google Inc., Office Action, CA 2610208, Sep. 21, 2011, 3 pgs.
Google Inc., Office Action, EP 06784449.8, Mar. 26, 2012, 7 pgs.
Google Inc., Office Action, JP 2008-504204, Oct. 12, 2011, 4 pgs.
Hogue, Notice of Allowance, U.S. Appl. No. 11/097,689, Apr. 30, 2009, 8 pgs.
Hogue, Notice of Allowance, U.S. Appl. No. 11/356,837, Jan. 6, 2012, 12 pgs.
Hogue, Notice of Allowance, U.S. Appl. No. 11/356,837, Apr. 27, 2012, 7 pgs.
Hogue, Notice of Allowance, U.S. Appl. No. 12/546,578, Jan. 6, 2011, 8 pgs.
Hogue, Notice of Allowance, U.S. Appl. No. 12/546,578, Jul. 12, 2011, 10 pgs.
Hogue, Notice of Allowance, U.S. Appl. No. 13/206,457, Mar. 14, 2012, 9 pgs.
Hogue, Notice of Allowance, U.S. Appl. No. 13/549,361, Oct. 2, 2013, 9 pgs.
Hogue, Notice of Allowance, U.S. Appl. No. 13/549,361, Jun. 26, 2013, 8 pgs.
Hogue, Notice of Allowance, U.S. Appl. No. 13/603,354, Nov. 12, 2013, 9 pgs.
Hogue, Notice of Allowance, U.S. Appl. No. 13/603,354, Jun. 26, 2013, 8 pgs.
Hogue, Office Action, U.S. Appl. No. 11/097,689, Oct. 30, 2008, 13 pgs.
Hogue, Office Action, U.S. Appl. No. 11/097,689, Apr. 9, 2008, 11 pgs.
Hogue, Office Action, U.S. Appl. No. 11/097,689, Jun. 21, 2007, 9 pgs.
Hogue, Office Action, U.S. Appl. No. 11/097,689, Nov. 27, 2007, 10 pgs.
Hogue, Office Action, U.S. Appl. No. 11/356,837, Jun. 3, 2011, 18 pgs.
Hogue, Office Action, U.S. Appl. No. 11/356,837, Aug. 4, 2010, 20 pgs.
Hogue, Office Action, U.S. Appl. No. 11/356,837, Feb. 8, 2011, 14 pgs.
Hogue, Office Action, U.S. Appl. No. 11/356,837, May 11, 2009, 18 pgs.
Hogue, Office Action, U.S. Appl. No. 11/356,837, Feb. 19, 2010, 20 pgs.
Hogue, Office Action, U.S. Appl. No. 11/356,837, Mar. 21, 2008, 15 pgs.
Hogue, Office Action, U.S. Appl. No. 11/356,837, Oct. 27, 2009, 20 pgs.
Hogue, Office Action, U.S. Appl. No. 11/356,837, Sep. 30, 2008, 20 pgs.
Hogue, Office Action, U.S. Appl. No. 11/399,857, Mar. 1, 2012, 25 pgs.
Hogue, Office Action, U.S. Appl. No. 11/399,857, Mar. 3, 2011, 15 pgs.
Hogue, Office Action, U.S. Appl. No. 11/399,857, Jan. 5, 2009, 21 pgs.
Hogue, Office Action, U.S. Appl. No. 11/399,857, Jun. 8, 2009, 14 pgs.
Hogue, Office Action, U.S. Appl. No. 11/399,857, Sep. 13, 2010, 13 pgs.
Hogue, Office Action, U.S. Appl. No. 11/399,857, Jun. 24, 2011, 14 pgs.
Hogue, Office Action, U.S. Appl. No. 11/399,857, Dec. 28, 2009, 11 pgs.
Hogue, Office Action, U.S. Appl. No. 11/399,857, Mar. 31, 2008, 23 pgs.
Hogue, Office Action, U.S. Appl. No. 12/546,578, Aug. 4, 2010, 10 pgs.
Hogue, Office Action, U.S. Appl. No. 13/206,457, Oct. 28, 2011, 6 pgs.
Hogue, Office Action, U.S. Appl. No. 13/549,361, Oct. 4, 2012, 18 pgs.
Hogue, Office Action, U.S. Appl. No. 13/549,361, Mar. 6, 2013, 13 pgs.
Hogue, Office Action, U.S. Appl. No. 13/603,354, Jan. 9, 2013, 5 pgs.
Hsu, Finite-state transducers for semi-structured text mining, 1999.
Ilyas, Rank-aware query optimization, Jun. 13-18, 2004, 12 pgs.

(56) References Cited

OTHER PUBLICATIONS

Kosala, Web mining research, Jul. 2000, 14 pgs.
Laroco, Notice of Allowance, U.S. Appl. No. 11/551,657, May 13, 2011, 8 pgs.
Laroco, Notice of Allowance, U.S. Appl. No. 11/551,657, Sep. 28, 2011, 8 pgs.
Laroco, Notice of Allowance, U.S. Appl. No. 13/364,244, Aug. 6, 2013, 6 pgs.
Laroco, Notice of Allowance, U.S. Appl. No. 13/364,244, Feb. 7, 2014, 5 pgs.
Laroco, Office Action, U.S. Appl. No. 11/551,657, Aug. 1, 2008, 15 pgs.
Laroco, Office Action, U.S. Appl. No. 11/551,657, Aug. 13, 2009, 16 pgs.
Laroco, Office Action, U.S. Appl. No. 11/551,657, Nov. 17, 2010, 20 pgs.
Laroco, Office Action, U.S. Appl. No. 11/551,657, Feb. 24, 2010, 17 pgs.
Laroco, Office Action, U.S. Appl. No. 11/551,657, Jan. 28, 2009, 17 pgs.
Laroco, Office Action, U.S. Appl. No. 13/364,244, Dec. 19, 2013, 5 pgs.
Laroco, Office Action, U.S. Appl. No. 13/364,244, Jan. 30, 2013, 8 pgs.
Lin, Question answering from the web using knowledge annotation and knowledge mining techniques, Nov. 3-8, 2003, 8 pgs.
Nadeau, Unspervised named-entity recognition: generating gazetteers and resolving ambiguity, Aug. 1, 2006, 12 pgs.
Nyberg, The JAVELIN question-answering system at TREC 2003, Nov. 18-21, 2003, 9 pgs.
Ogden, Improving cross-language text retrieval with human interactions, Jan. 2000, 9 pgs.
Plaisant, Interface and data architecture for query preview in networked information systems, Jul. 1999, 28 pgs.
Rohde, Notice of Allowance, U.S. Appl. No. 11/097,690, Dec. 23, 2010, 8 pgs.
Rohde, Office Action, U.S. Appl. No. 11/097,690, May 1, 2008, 21 pgs.
Rohde, Office Action, U.S. Appl. No. 11/097,690, Jun. 9, 2010, 11 pgs.
Rohde, Office Action, U.S. Appl. No. 11/097,690, Oct. 15, 2008, 22 pgs.
Rohde, Office Action, U.S. Appl. No. 11/097,690, Aug. 27, 2009, 13 pgs.
Rohde, Office Action, U.S. Appl. No. 11/097,690, Apr. 28, 2009, 9 pgs.
Rohde, Office Action, U.S. Appl. No. 11/097,690, Sep. 28, 2007, 17 pgs.
Shamsi, Final Office Action, U.S. Appl. No. 13/171,296, Nov. 4, 2013, 29 pgs.
Shamsi, Notice of Allowance, U.S. Appl. No. 11/781,891, Oct. 25, 2010, 7 pgs.
Shamsi, Notice of Allowance, U.S. Appl. No. 11/781,891, May 27, 2010, 6 pgs.
Shamsi, Office Action, U.S. Appl. No. 11/781,891, Nov. 16, 2009, 10 pgs.
Shamsi, Office Action, U.S. Appl. No. 13/171,296, Apr. 3, 2013, 7 pgs.
Vespe, Notice of Allowance, U.S. Appl. No. 11/686,217, Aug. 27, 2012, 11 pgs.
Vespe, Notice of Allowance, U.S. Appl. No. 11/745,605, Jun. 13, 2011, 9 pgs.
Vespe, Notice of Allowance, U.S. Appl. No. 11/745,605, Sep. 22, 2011, 9 pgs.
Vespe, Notice of Allowance, U.S. Appl. No. 11/745,605, Mar. 28, 2012, 10 pgs.
Vespe, Office Action, U.S. Appl. No. 11/686,217, Sep. 10, 2010, 14 pgs.
Vespe, Office Action, U.S. Appl. No. 11/686,217, Jan. 26, 2012, 12 pgs.
Vespe, Office Action, U.S. Appl. No. 11/686,217, Mar. 26, 2010, 13 pgs.
Vespe, Office Action, U.S. Appl. No. 11/745,605, Apr. 8, 2010, 15 pgs.
Vespe, Office Action, U.S. Appl. No. 11/745,605, Jul. 30, 2009, 17 pgs.
Zhao, Corroborate and learn facts from the web, Aug. 12-15, 2007, 9 pgs.
Zhao, Notice of Allowance, U.S. Appl. No. 11/394,610, May 11, 2009, 15 pgs.
Zhao, Notice of Allowance, U.S. Appl. No. 11/941,382, Apr. 14, 2014, 5 pgs.
Zhao, Office Action, U.S. Appl. No. 11/142,853, Oct. 2, 2009, 10 pgs.
Zhao, Office Action, U.S. Appl. No. 11/142,853, Sep. 5, 2008, 9 pgs.
Zhao, Office Action, U.S. Appl. No. 11/142,853, Mar. 17, 2009, 9 pgs.
Zhao, Office Action, U.S. Appl. No. 11/142,853, Jan. 25, 2008, 7 pgs.
Zhao, Office Action, U.S. Appl. No. 11/394,610, Apr. 1, 2008, 18 pgs.
Zhao, Office Action, U.S. Appl. No. 11/394,610, Nov. 13, 2008, 18 pgs.
Zhao, Office Action, U.S. Appl. No. 11/941,382, Sep. 8, 2011, 28 pgs.
Zhao, Office Action, U.S. Appl. No. 11/941,382, Aug. 12, 2010, 23 pgs.
Zhao, Office Action, U.S. Appl. No. 11/941,382, May 24, 2012, 26 pgs.
Zhao, Office Action, U.S. Appl. No. 11/941,382, Nov. 26, 2012, 24 pgs.
Zhao, Office Action, U.S. Appl. No. 11/941,382, Jan. 27, 2011, 24 pgs.
Zhao, Office Action, U.S. Appl. No. 11/941,382, Sep. 27, 2013, 30 pgs.
Zhao, Office Action, U.S. Appl. No. 11/941,382, Dec. 29, 2009, 25 pgs.
Agichtein, *Snowball: Extracting Relations from Large Plain-Text Collections*, Columbia University Computer Science Dept. Technical Report CUCS-033-99, Dec. 1999, pp. 1-13.
Andritsos, *Information—Theoretic Tools for Mining Database Structure from Large Data Sets*, ACM SIGMOD 2004, Jun. 13-18, 2004, 12 pages.
Brill, *An Analysis of the AskMSR Question-Answering System*, Proceedings of the Conference of Empirical Methods in Natural Language Processing (EMNLP), Jul. 2002, pp. 257-264.
Brin, *Extracting Patterns and Relations from the World Wide Web*, Computer Science Department, Stanford University, 1999, 12 pages.
Brin, *The Anatomy of a Large-Scale Hypertextual Web Search Engine*, 7th International World Wide Web Conference, Brisbane, Australia, Apr. 14-18, 1998, pp. 1-26.
Bunescu, *Using Encyclopedic Knowledge for Named Entity Disambiguation*, Department of Computer Sciences, University of Texas at Austin, retrieved from internet Dec. 28, 2006, 8 pages.
Chang, *IEPAD: Information Extraction Based on Pattern Discovery*, WWW10 '01, ACM, Hong Kong, May 1-5, 2001, pp. 681-688.
Chen, *A Scheme for Inference Problems Using Rough Sets and Entropy*, Department of Computer Science, Lakehead University, Thunder Bay, ON, Canada, Springer-Verlag Berlin Heidelberg, 2005, pp. 558-567.
Chu-Carroll, *A Multi-Strategy with Multi-Source Approach to Question Answering*, IBM T.J. Watson Research Center, Yorktown Heights, NY, 2006, 8 pages.
Craswell, *Effective Site Finding using Link Anchor Information*, SIGIR '01, New Orleans, LA, Sep. 9-12, 2001, pp. 250-257.
Dean, *MapReduce: Simplified Data Processing on Large Clusters*, OSDI, 2004, pp. 1-13.
Dong, *Reference Reconciliation in Complex Information Spaces*, SIGACM-SIGMOD, Baltimore, MD, 2005, 12 pages.
Downey, *Learning Text Patterns for Web Information Extraction and Assessment*, American Association for Artificial Intelligence, 2002, 6 pages.
Etzioni, *Web-scale Information Extraction in KnowItAll (Preliminary Results)*, WWW2004, ACM, New York, NY, May 17-20, 2004, 11 pages.
Freitag, *Boosted Wrapper Induction*, American Association for Artificial Intelligence, 2000, 7 pages.

(56) References Cited

OTHER PUBLICATIONS

Gao, *Learning Information Extraction Patterns from Tabular Web Pages Without Manual Labelling*, Proceedings of IEEE/WIC Int'l Conf. on Web Intelligence (WI'03), Oct. 13-17, 2003, pp. 495-498.
Guha, *Disambiguating People in Search*, WWW2004, New York, NY, May 17-22, 2004, 9 pages.
Guha, *Object Co-Identification on the Semantic Web*, WWW2004, ACM, New York, NY, May 17-22, 2004, 9 pages.
Haveliwala, *Topic-Sensitive PageRank*, WWW2002, Honolulu, HI, May 7-11, 2002, pp. 1-23.
Hogue, *Tree Pattern Inference and Matching for Wrapper Induction on the World Wide Web*, Master of Engineering in Electrical Engineering and Computer Science, Massachusetts Institute of Technology, Rine 2004, pp. 1-106.
Information Entropy—Wikipedia, the free encyclopedia, retrieved on May 3, 2006, pp. 1-9.
Information Theory—Wikipedia, the free encyclopedia, retrieved on May 3, 2006, pp. 1-12.
International Search Report and Written Opinion, PCT/US06/07639, Sep. 13, 2006, 5 pages.
International Search Report and Written Opinion, PCT/US07/61156, Feb. 11, 2008, 7 pages.
International Search Report and Written Opinion, PCT/US2006/019807, Dec. 18, 2006, 10 pages.
Jeh, *Scaling Personalized Web Search*, WWW2003, Budapest, Hungary, May 20-24, 2003, pp. 1-24.
Ji, *Re-Ranking Algorithms for Name Tagging*, Workshop on Computationally Hard Problems and Joint Inference in Speech and Language Processing, New York University, NY, Jun. 2006, 8 pages.
Jones, *Bootstrapping for Text Learning Tasks*, Carnegie Mellon University, Pittsburgh, PA, 1999, 12 pages.
Koeller, *Approximate Matching of Textual Domain Attributes for Information Source Integration*, IQIS2005, Baltimore, MD, Jun. 17, 2005, pp. 77-86.
Kolodner, *Indexing and Retrieval Strategies for Natural Language Fact Retrieval*, ACM Transactions on Database Systems, vol. 8, No. 3, Sep. 1983, pp. 434-464.
Kosseim, *Answer Formulation for Question-Answering*, Concordia University, Montreal, Quebec, Canada, Oct. 1, 2007, 11 pages.
Liu, *Mining Data Records in Web Pages*, Conference '00, ACM 2000, pp. 1-10.
Mann, *Unsupervised Personal Name Disambiguation*, Department of Computer Science, Johns Hopkins University, Baltimore, MD, Proceedings of the Seventy Conference on Natural Language Learning at HLT-NAACL, 2003, 8 pages.
McCallum, *Object Consolidation by Graph Partitioning with a Conditionally-Trained Distance Metric*, SIGKDD 03, Washington, DC, Aug. 24-27, 2003, 6 pages.
Microsoft Computer Dictionary defines "normalize" as "adjust number within specific range", May 1, 2002, 4 pages.
Microsoft Computer Dictionary Defines "quantity" as a "number", May 1, 2002, 4 pages.
Microsoft Computer Dictionary defines "value" as "a quantity", May 1, 2002, 4 pages.
Mihalcea, *PageRank on Semantic Networks, with Application to Word Sense Disambiguation*, Proceedings of the 20th International Conference on Computational Linguistics, Aug. 23-27, 2004, 7 sales.
Mihalcea, *TextRank: Bringing Order into Texts*, Proceedings of the Conference on Empirical Methods in Natural Language Processing, Jul. 2004, 8 pages.
Page, *The PageRank Citation Ranking: Bringing Order to the Web*, Stanford Digital Libraries Working Paper, 1998, pp. 1-17.
Pawson, *Sorting and Grouping*, www.dpawson.co.uk/xsl/sect2/N6280.html, Feb. 7, 2004, pp. 1-19.
Prager, *IBM's Piquant in TREC2003*, 2003, 10 pages.
Prager, *Question Answering Using Constraint Satisfaction: QA—by Dossier with Constraints*, 2004, 8 pages.
Ramakrishnan, *Is Question Answering an Acquired Skill?*, WWW2004, New York, NY, May 17, 2004, pp. 111-120.
Richardson, *Beyond Page Rank: Machine Learning for Static Ranking*, WWW2006, Edinburgh, Scotland, 23-26 May 20069 pages, May 2006.
Richardson, *The Intelligent Surfer: Probabilistic Combination of Link and Content Information in PageRank*, Advances in Neural Information Processing Systems, vol. 14, MIT Press, Cambridge, MA, 2002, 8 pages.
Riloff, *Learning Dictionaries for Information Extraction by Multi-Level Bootstrapping*, AAAI-99, 1999, 6 pages.
Sun Microsystems, *Attribute Names*, http://java.sun.com/products/jndi/tutorial/basics/directory/attrnames.html, Feb. 17, 2004, 2 pages.
Wang, *C4-2: Combining Link and Contents in Clustering Web Search Results to Improve Information Interpretation*, The University of Tokyo, Tokyo, Japan, 2002, , pp. 1-9.

\* cited by examiner

US 8,996,470 B1

SYSTEM FOR ENSURING THE INTERNAL CONSISTENCY OF A FACT REPOSITORY

RELATED APPLICATIONS

This application is related to the following applications, each of which is hereby incorporated by reference:

U.S. patent application Ser. No. 11/097,688, "Corroborating Facts Extracted from Multiple Sources," filed on Mar. 31, 2005;

U.S. patent application Ser. No. 11/097,690, "Selecting the Best Answer to a Fact Query from Among a Set of Potential Answers," filed on Mar. 31, 2005;

U.S. patent application Ser. No. 11/097,689, "User Interface for Facts Query Engine with Snippets from Information Sources that Include Query Terms and Answer Terms," filed on Mar. 31, 2005;

U.S. patent application Ser. No. 11/142,853, "Learning Facts from Semi-Structured Text," filed on May 31, 2005;

U.S. patent application Ser. No. 11/142,740, "Merging Objects in a Facts Database," filed on May 31, 2005; and U.S. patent application Ser. No. 11/142,765, "Identifying the Unifying Subject of a Set of Facts," filed on May 31, 2005.

TECHNICAL FIELD

The disclosed embodiments relate generally to fact databases. More particularly, the disclosed embodiments relate to methods and systems for maintaining the internal consistency of a fact database.

BACKGROUND

The World Wide Web (also known as the "Web") and the web pages within the Web are a vast source of factual information. Users may look to web pages to get answers to factual questions, such as "what is the capital of Poland" or "what is the birth date of George Washington." The factual information included in web pages may be extracted and stored in a fact database.

A fact database may, at times, become internally inconsistent. When a fact database is populated with data, there may be gaps in the data for which the database building module does not have the data to fill. When fact database maintenance operations are performed, data may be modified or removed, resulting in possible data inconsistencies. These internal inconsistencies may diminish the quality of the fact database.

SUMMARY

According to an aspect of the invention, a method of improving internal consistency of a database includes accessing a set of objects in the database (e.g., a fact repository), each object including one or more attribute-value pairs, wherein at least a subset of the values in the attribute-value pairs includes respective links to other objects; filtering the attribute-value pairs of the objects to remove attribute-value pairs meeting predefined criteria, wherein objects meeting a null information criterion after the filtering comprise null objects; identifying attribute-value pairs of the objects including links to null objects; and removing the links to null objects.

BRIEF DESCRIPTION OF THE DRAWINGS

Like reference numerals refer to corresponding parts throughout the drawings.

DESCRIPTION OF EMBODIMENTS

Within a fact repository organized based on objects (representing entities and concepts) and facts associated with objects, a fact may reference another object. In other words, facts may serve as connections between objects. For example, the fact that Tokyo is the capital of Japan connects objects representing Tokyo and Japan. The reference to the other object may include a link to the other object (such as an object identifier) and a name of the other object. However, the name of the other object may be missing or incorrect, even though the link may be correct. Furthermore, the other object may be "removed" from the fact database during fact database maintenance operations, resulting in a dangling link. Both missing or incorrect object names and dangling links represent internal inconsistencies in the fact database. The internal inconsistencies may be remedied by inserting the name of an object into facts that link to the object and removing dangling links.

Figure 1:
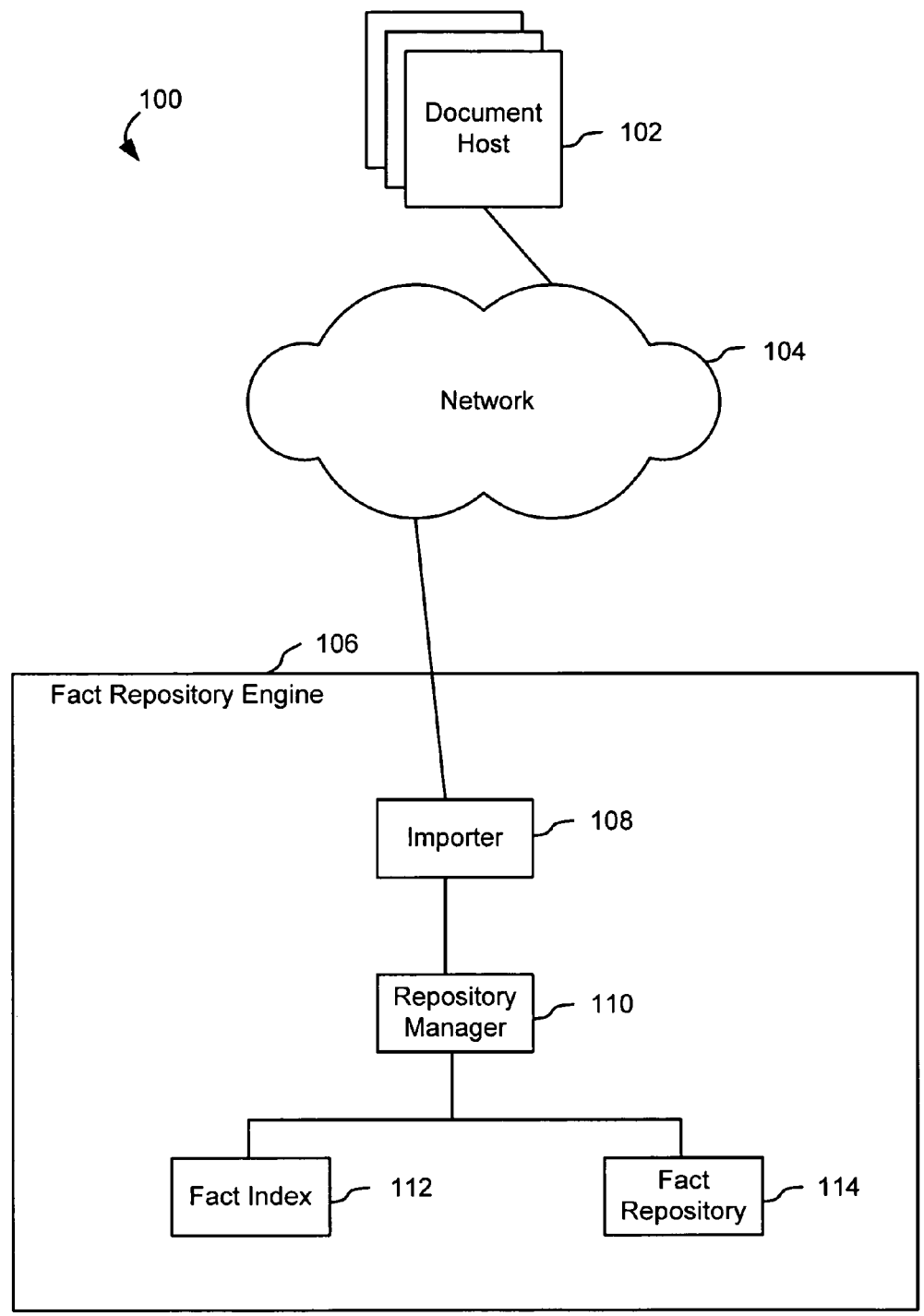
FIG. 1 illustrates a network, according to some embodiments of the invention.

FIG. 1 illustrates a network 100, according to some embodiments of the invention. Network 100 includes one or more document hosts 102 and a fact repository engine 106. The network 100 also includes one or more networks 104 that couple these components.

The document hosts 102 store documents and provide access to documents. A document may be any machine-readable data including any combination of text, graphics, multimedia content, etc. In some embodiments, a document may be a combination of text, graphics and possible other forms of information written in the Hypertext Markup Language (HTML), i.e., a web page. A document may include one or more hyperlinks to other documents. A document may include one or more facts within its contents. A document stored in a document host 102 may be located and/or identified by a Uniform Resource Locator (URL), or Web address, or any other appropriate form of identification and/or location.

The fact repository engine 106 includes an importer 108, a repository manager 110, a fact index 112, and a fact repository 114. The importer 108 extracts factual information from documents stored on document hosts 102. The importer 108 analyzes the contents of the documents stored in document host 102, determines if the contents include factual information and the subject or subjects with which the factual information are associated, and extracts any available factual information within the contents.

The repository manager 110 processes facts extracted by the importer 108. The repository manager 110 builds and manages the fact repository 114 and the fact index 112. The repository manager 110 receives facts extracted by the importer 108 and stores them in the fact repository 114. The repository manager 110 may also perform operations on facts in the fact repository 114 to "clean up" the data within the fact repository 114. For example, the repository manager 110 may look through the fact repository 114 to find duplicate facts (that is, facts that convey the exact same factual information) and merge them. The repository manager 110 may also normalize facts into standard formats. The repository manager 110 may also remove unwanted facts from the fact repository 114, such as facts related to pornographic content.

The fact repository 114 stores factual information extracted from a plurality of documents that are located on the document hosts 102. In other words, the fact repository 114 is a database of factual information. A document from which a particular fact may be extracted is a source document (or "source") of that particular fact. In other words, a source of a fact includes that fact within its contents. Source documents may include, without limitation, Web pages. Within the fact repository 114, entities, concepts, and the like for which the fact repository 114 may have factual information stored are represented by objects. An object may have one or more facts associated with it. Within each object, each fact associated with the object is stored as an attribute-value pair. Each fact also includes a list of source documents that include the fact within its contents and from which the fact was extracted. Further details about objects and facts in the fact repository are described below, in relation to FIG. 2.

The fact index 112 provides an index to the fact repository 114 and facilitates efficient lookup of information in the fact repository 114. The fact index 112 may index the fact repository 114 based on one or more parameters. For example, the fact index 112 may have an index that maps unique terms (e.g., words, numbers and the like) to records or locations within the fact repository 114. More specifically, the fact index 112 may include entries mapping every term in every object name, fact attribute and fact value of the fact repository to records or locations within the fact repository.

It should be appreciated that each of the components of the fact repository engine 106 may be distributed over multiple computers. For example, the fact repository 114 may be deployed over N servers, with a mapping function such as the "modulo N" function being used to determine which facts are stored in each of the N servers. Similarly, the fact index 112 may be distributed over multiple servers, and the importer 108 and repository manager 110 may each be distributed over multiple computers. However, for convenience of explanation, we will discuss the components of the fact repository engine 106 as though they were implemented on a single computer.

Figure 2:
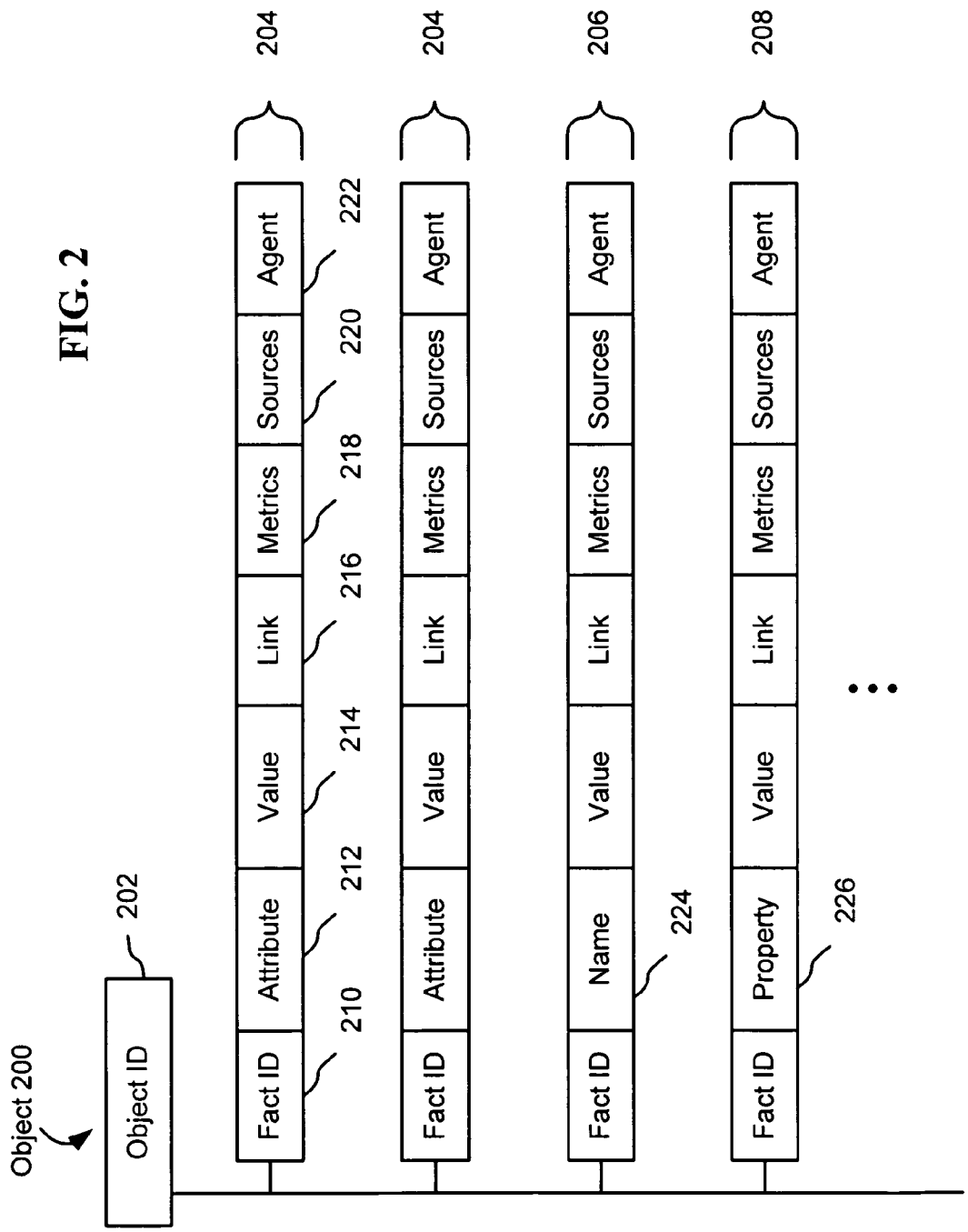
FIG. 2 is a block diagram illustrating a data structure for an object within a fact repository, according to some embodiments of the invention.

FIG. 2 illustrates an exemplary data structure for an object within the fact repository 114, according to some embodiments of the invention. As described above, the fact repository 114 includes objects, each of which may include one or more facts. Each object 200 includes a unique identifier, such as the object ID 202. The object 200 includes one or more facts 204. Each fact 204 includes a unique identifier for that fact, such as a fact ID 210. Each fact 204 includes an attribute 212 and a value 214. For example, facts included in an object representing George Washington may include facts having attributes of "date of birth" and "date of death," and the values of these facts would be the actual date of birth and date of death, respectively. A fact 204 may include a link 216 to another object, which is the object identifier, such as the object ID 202 of another object within the fact repository 114. The link 216 allows objects to have facts whose values are other objects. For example, for an object "United States," there may be a fact with the attribute "president" whose value is "George W. Bush,", with "George W. Bush" being another object in the fact repository 114. In some embodiments, the value field 214 stores the name of the linked object and the link 216 stores the object identifier of the linked object. In some other embodiments, facts 204 do not include a link field 216 because the value 214 of a fact 204 may store a link to another object.

Each fact 204 also may include one or more metrics 218. The metrics may provide indications of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of sources 220 that include the fact and from which the fact was extracted. Each source may be identified by a Uniform Resource Locator (URL), or Web address, or any other appropriate form of identification and/or location, such as a unique document identifier.

In some embodiments, some facts may include an agent field 222 that identifies the module that extracted the fact. For example, the agent may be a specialized module that extracts facts from a specific source (e.g., the pages of a particular web site, or family of web sites) or type of source (e.g., web pages that present factual information in tabular form), or a module that extracts facts from free text in documents throughout the Web, and so forth.

In some embodiments, an object 200 may have one or more specialized facts, such as a name fact 206 and a property fact 208. A name fact 206 is a fact that conveys a name for the entity or concept represented by the object 200. For example, for an object representing the country Spain, there may be a fact conveying the name of the object as "Spain." A name fact 206, being a special instance of a general fact 204, includes the same parameters as any other fact 204; it has an attribute, a value, a fact ID, metrics, sources, etc. The attribute 224 of a name fact 206 indicates that the fact is a name fact, and the value is the actual name. The name may be a string of characters. An object 200 may have one or more name facts, as many entities or concepts can have more than one name. For example, an object representing Spain may have name facts conveying the country's common name "Spain" and the official name "Kingdom of Spain." As another example, an object representing the U.S. Patent and Trademark Office may have name facts conveying the agency's acronyms "PTO" and "USPTO" and the official name "United States Patent and Trademark Office." If an object does have more than one name fact, one of the name facts may be designated as a primary name and other name facts may be designated as secondary names.

A property fact 208 is a fact that conveys a statement about the entity or concept represented by the object 200 that may be of interest. For example, for the object representing Spain, a property fact may convey that Spain is a country in Europe. A property fact 208, being a special instance of a general fact 204, also includes the same parameters (such as attribute, value, fact ID, etc.) as other facts 204. The attribute field 226 of a property fact 208 indicates that the fact is a property fact, and the value field is a string of text that conveys the statement of interest. For example, for the object representing Spain, the value of a property fact may be the text string "is a country in Europe." Some objects 200 may have one or more property facts while other objects may have no property facts.

It should be appreciated that the data structure illustrated in FIG. 2 and described above is merely exemplary. The data structure of the fact repository 114 may take on other forms. Other fields may be included in facts and some of the fields described above may be omitted. Additionally, each object may have additional special facts aside from name facts and property facts, such as facts conveying a type or category (for example, person, place, movie, actor, organization, etc.) for categorizing the entity or concept represented by the object. In some embodiments, an object's name(s) and/or properties may be represented by special records that have a different format than the general facts records 204 associated with the attribute-value pairs of an object.

An object is a collection of facts. An object may become a null or empty object when facts are removed from the object. In some embodiments, a null object is an object that has had all of its facts (including name facts) removed, leaving the object with only its object ID. In some other embodiments, a null object is an object that has all of its facts other than name facts removed, leaving the object with its object ID and name facts. In further other embodiments, where an object has names in special records that have a different format from general facts, the object is a null object only if all of its associated facts, not including the special records for its names, are removed. Alternatively, the object may be a null object only if all of its facts and the special records for its names are removed. A null object represents an entity or concept for which the fact repository engine 106 has no factual information and, as far as the fact repository engine 106 is concerned, does not exist. In some embodiments, a null object may be left in the fact repository 114. However, the null object is treated as if it was removed from the fact repository 114. In some other embodiments, null objects are removed from the fact repository 114.

Figure 3:
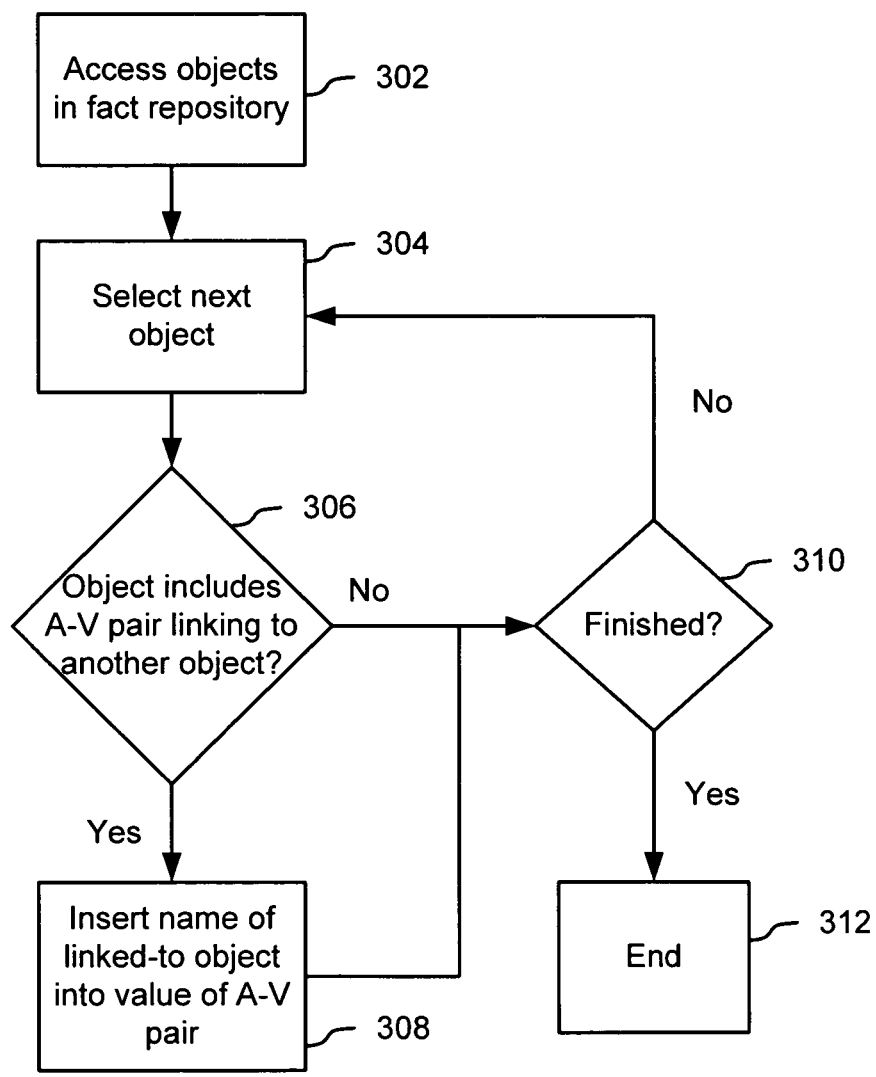
FIG. 3 is a flow diagram illustrating a process for dereferencing attribute-value pairs, according to some embodiments of the invention.

FIG. 3 is a flow diagram illustrating a process for dereferencing attribute-value pairs, according to some embodiments of the invention. In a fact repository that is organized based on objects and facts (represented by attribute-value pairs, and optionally additional parameters as well) associated with objects, a fact may refer to other objects by name and/or by an identifier, such as an object ID. A fact that references another object may include only the object ID, or the object ID and an incorrect object name. The dereferencing process fills in the proper object name into the fact. The dereferencing process is similar to the functionality of the dereference operator in the C++ programming language. In C++, the dereference operator takes a pointer to a value and returns the value. In the process of FIG. 3, the fact repository engine takes a link to an object (the pointer) and inserts the name of the object.

A set of objects, stored in the fact repository 114, is accessed (302). The set of objects accessed may be the entirety of objects that are stored in the fact repository 114, or the set of accessed objects may be a subset of the entirety of objects stored in the fact repository 114. At least some of the accessed objects include one or more facts. In some embodiments, a fact, as described above in relation to FIG. 2, corresponds to an attribute-value pair (hereinafter called "A-V pair" for convenience). A fact may optionally be represented by additional parameters as well. It should be appreciated that while the description of FIGS. 3 and 4 below refer to A-V pairs, the description may be extended to facts having other, different data storage formats. Some of the A-V pairs may include links to other objects. That is, some of the A-V pairs may include links to objects other than the object with which the respective A-V pair is associated. The linked-to object may be any object in the fact repository 114 (including null objects) other than the object with which the A-V pair having the link is associated. The links may be the identifiers of the linked-to objects, as described above, in relation to FIG. 2. Some A-V pairs having links to objects may also include the names of the respective linked-to object in the value of the A-V pair, in addition to having the identifier of the linked-to object.

One of the objects in the set is selected (304). If the object does not include an A-V pair that includes a link to another object (306—no), nothing is done to that object. If the object includes one or more A-V pairs that include links to other objects (306—yes), the name of the respective linked-to object is inserted into the respective value of each A-V pair with a link to the linked-to object (308). If the value of an A-V pair already has a name for the linked-to object, in some embodiments that name is replaced by the inserted name, regardless of whether the pre-existing name is the same as the inserted name. In some other embodiments, the pre-existing name in an A-V pair is first compared against the name of the linked-to object. The name of the linked-to object in the A-V pair is replaced with the name of the linked-to object if the names do not match. In embodiments where a fact stores a link in the value field, the link is not replaced by the name when the name is inserted. Rather, the name and the link are concatenated and the concatenated string is stored in the value field.

If there are objects in the set remaining to be selected (310—no), another object is selected (304). Otherwise (310—yes), the process ends (312). The process may be repeated at scheduled intervals, or as needed.

In some embodiments, after operation 302, an optional table of object identifiers and object names may be built. The table maps object identifiers to their corresponding object names (in some embodiments, the primary names). The table may be loaded into memory. When inserting names into values, as described above, the fact repository engine 106 may refer to the table rather than searching for the object identifier in the fact repository itself. This may help make the dereferencing process more efficient.

As described above, an object may have more than one name. If the linked-to object has more than one name and one of them is designated the primary name, then the primary name is the one that is inserted into the value.

Figure 4:
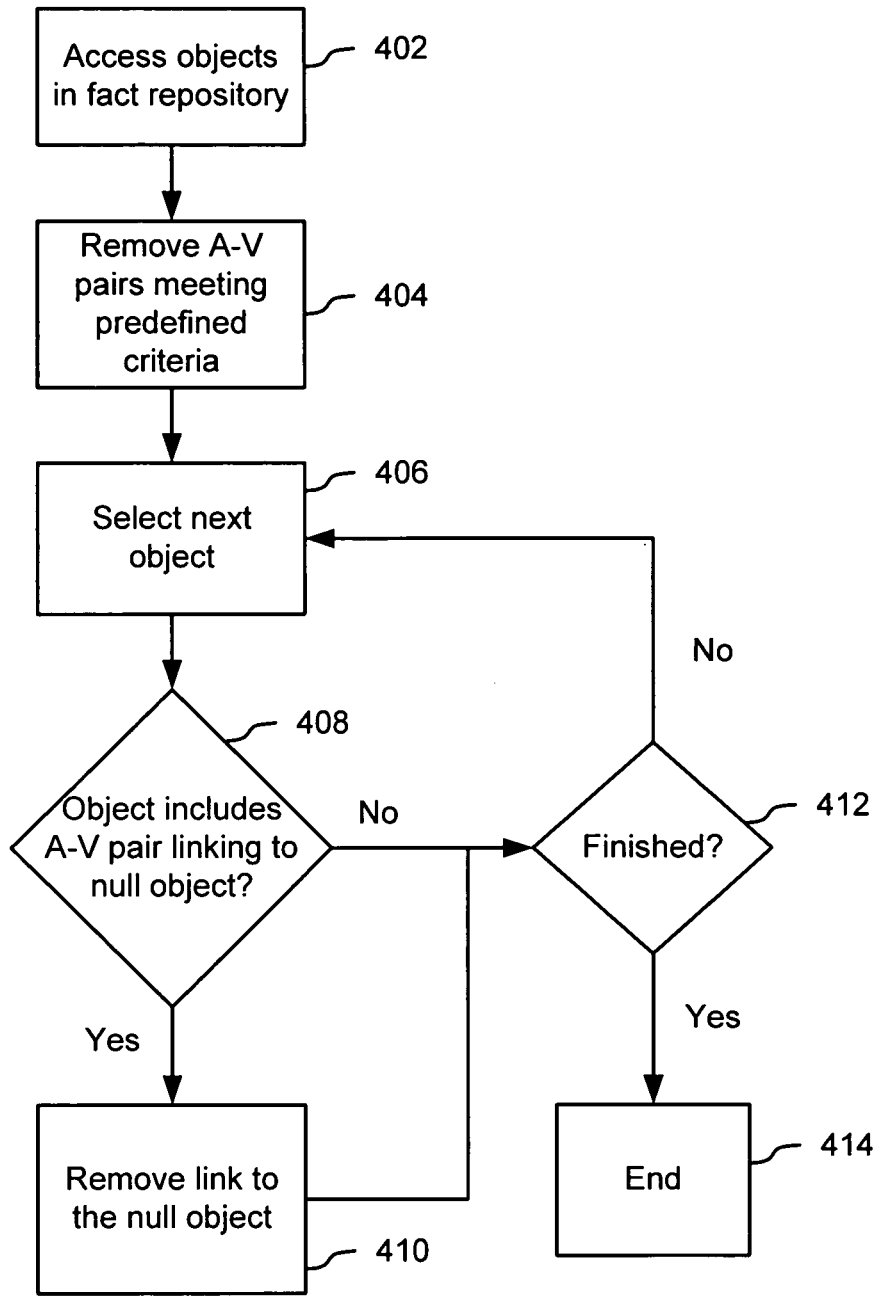
FIG. 4 is a flow diagram illustrating a process for checking references in attribute-value pairs, according to some embodiments of the invention.

FIG. 4 is a flow diagram illustrating a process for checking references in attribute-value pairs, according to some embodiments of the invention. A set of objects, stored in the fact repository 114, is accessed (402). In some embodiments, the set of objects accessed is the entirety of objects that are stored in the fact repository 114. At least some of the accessed objects include one or more facts as A-V pairs. Some of the A-V pairs may include links to other objects in the set of objects.

One or more filters are applied to the A-V pairs of the objects and A-V pairs meeting predefined criteria are removed (404). The filters identify A-V pairs that meet predefined criteria and remove them. The predefined criteria may be defined based on the information conveyed by the A-V pair. For example, one predefined criterion for removal may be that an A-V pair is to be removed if it conveys a fact associated with pornography. In some embodiments, the predefined criteria may be implemented using heuristics and/or blacklists. The filters would apply the heuristics to the A-V pairs or compare the A-V pairs against a blacklist to determine which A-V pairs warrant removal. After the filtering, some objects may become null objects due to the removal of A-V pairs from the object.

One of the objects in the set is selected (406). If the object does not include an A-V pair that includes a link to another object or if all links in the A-V pairs of the object are to non-null objects (408—no), nothing is done to that object. If the object includes one or more A-V pairs that include links to null objects (408—yes), the links to null objects are removed (410).

In some embodiments, the removal of a link to a null object is performed by removing the identifier of the null object from the value of the A-V pair having the link to the null object. This link removal method is used only if there is already a name of the null object in the value of the A-V pair. In some other embodiments, the link is removed by removing the A-V pair (i.e., removing the fact) from the object. In further other embodiments, both manners of removal may be used; which one is used may depend on the circumstances with regard to how the linked-to object became a null object. For example, if the linked-to object became a null object because its associated A-V pairs were removed due to their meeting a first predefined criterion, then the manner of removal to be used may be removal of the A-V pair. On the other hand, if the associated A-V pairs were removed due to their meeting a second predefined criterion, then the manner of removal to be used may be removal of the identifier of the null object, leaving the name of the linked-to object in the value of the A-V pair.

If there are objects in the set remaining to be selected (412—no), another object is selected (406). Otherwise (412—yes), the process ends (414). In the embodiments where a manner of removal of the links to null objects includes removing the A-V pair with the link, instead of ending at 414, operations 406-412 may be repeated for additional iterations because the removal of the A-V pairs may create new null objects. While operations 406-412 may be repeated indefinitely, in some embodiments, a predefined limit on the number of additional iterations may be set. For example, after the first iteration, a limit may be set such that only one additional iteration is performed. It should be appreciated, however, that the process as illustrated in FIG. 4 may be performed at scheduled intervals or as needed. Furthermore, it should be appreciated that the filtering operation 404 and the reference checking operations 406-414 may be performed in accordance with different, independent schedules. For example, the filtering may be performed once a week and the reference checking may be performed once every 2 weeks. More generally, operations 406-414 do not have to be performed immediately after the filtering operation 404.

Figure 5:
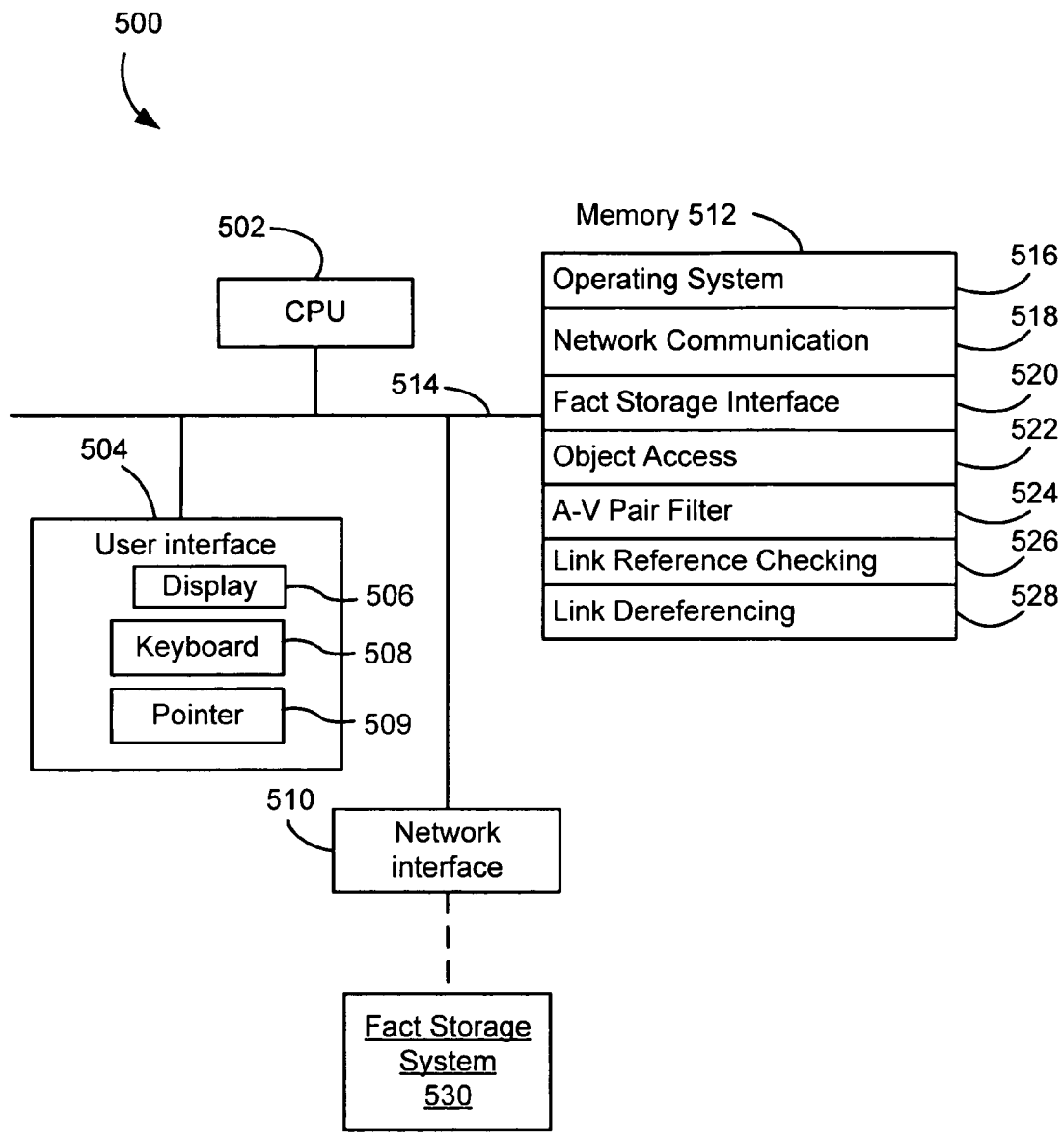
FIG. 5 illustrates a dereferencing and reference checking system, according to some embodiments of the invention.

FIG. 5 is a block diagram illustrating a consistency maintenance system 500, according to some embodiments of the invention. The system 500 typically includes one or more processing units (CPU's) 502, one or more network or other communications interfaces 510, memory 512, and one or more communication buses 514 for interconnecting these components. The system 500 optionally may include a user interface 504 comprising a display device 506, keyboard 508 and pointer device 509, such as a mouse, track ball or touch sensitive pad. Memory 512 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 512 may optionally include one or more storage devices remotely located from the CPU(s) 502. In some embodiments, the memory 512 stores the following programs, modules and data structures, or a subset thereof:

an operating system 516 that includes procedures for handling various basic system services and for performing hardware dependent tasks;

a network communication module (or instructions) 518 that is used for connecting the consistency maintenance system 500 to other computers via the one or more communication network interfaces 510 (wired or wireless), such as the Internet, other wide area networks, local area networks, metropolitan area networks, and so on;

a fact storage interface (or instructions) 520 that provides an interface to the fact storage system 530 (which may include a fact index and fact repository, and/or other appropriate data structures);

an object access module (or instructions) 522 that is used to access objects and associated attribute-value pairs;

an A-V pair filter (or instructions) 524 that removes attribute-value pairs that meet predefined criteria from objects;

a link reference checking module (or instructions) 526 that checks attribute-value pairs for links to null objects and removes the links to null objects; and a link dereferencing module (or instructions) 528 that checks attribute-value pairs for links to objects and inserts the object names into the values of attribute-value pairs having links to objects.

The system 500 also includes a fact storage system 530 for storing facts. As described above, in some embodiments each fact stored in the fact storage system 530 includes a corresponding list of sources from which the respective fact was extracted.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 512 may store a subset of the modules and data structures identified above. Furthermore, memory 512 may store additional modules and data structures not described above.

Although FIG. 5 shows a "consistency maintenance system," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a consistency maintenance system and how features are allocated among them will vary from one implementation to another, and may depend in part on the amount of data traffic that the system must handle during peak usage periods as well as during average usage periods, and may further depend on the size of the fact repository and the amount of fact information each server can efficiently handle.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of improving internal consistency of a database, comprising:
   at a system having one or more processors and memory storing one or more modules to be executed by the one or more processors:
   accessing a first set of objects in the database, each object including one or more attribute-value pairs, wherein at least a subset of the values in the one or more attribute-value pairs includes respective links to other objects in the database;
   filtering the database by identifying attribute-value pairs of the first set of objects in the database that meet predefined criteria and removing the identified attribute-value pairs from the first set of objects in the database, wherein objects in the database meeting a null information criterion after the filtering comprise null objects;
   after the filtering, identifying a second set of objects that include attribute-value pairs having links to the null objects; and
   removing from the second set of objects the attribute-value pairs having links to the null objects.

2. The computer-implemented method of claim 1, wherein objects meeting the null information criterion have no attribute-value pairs.

3. The computer-implemented method of claim 1, further comprising, for each of the subset of the values, inserting a name of a respective other object into the respective value.

4. A system for improving internal consistency of a database, comprising:
   one or more processors; and
   memory storing one or more modules to be executed by the one or more processors;
   the one or more modules including instructions:
      to access a first set of objects in the database, each object including one or more attribute-value pairs, wherein at least a subset of the values in the one or more attribute-value pairs includes respective links to other objects in the database;
      to filter the database by identifying attribute-value pairs of the first set of objects in the database that meet predefined criteria and removing the identified attribute-value pairs from the first set of objects in the database, wherein objects in the database meeting a null information criterion after the filtering comprise null objects;
      to identify, after the filtering, a second set of objects that include attribute-value pairs having links to the null objects; and
      to remove from the second set of objects the attribute-value pairs having links to the null objects.

5. The system of claim 4, wherein objects meeting the null information criterion have no attribute-value pairs.

6. The system of claim 4, further comprising instructions to, for each of the subset of the values, insert a name of a respective other object into the respective value.

7. A non-transitory computer readable storage medium storing one or more programs for execution by one or more processors in a computer system, the one or more programs comprising instructions for:
   accessing a first set of objects in the database, each object including one or more attribute-value pairs, wherein at least a subset of the values in the one or more attribute-value pairs includes respective links to other objects in the database;
   filtering the database by identifying attribute-value pairs of the first set of objects in the database that meet predefined criteria and removing the identified attribute-value pairs from the first set of objects in the database, wherein objects in the database meeting a null information criterion after the filtering comprise null objects;
   identifying, after the filtering, a second set of objects that include attribute-value pairs having links to the null objects; and
   removing from the second set of objects the attribute-value pairs having links to the null objects.

8. The non-transitory computer readable storage medium of claim 7, wherein objects meeting the null information criterion have no attribute-value pairs.

9. The non-transitory computer readable storage medium of claim 7, the one or more programs further comprising instructions for, for each of the subset of the values, inserting a name of a respective other object into the respective value.

10. A system for improving internal consistency of a database, comprising:
    one or more processors;
    memory;
    means for accessing a first set of objects in the database, each object including one or more attribute-value pairs, wherein at least a subset of the values in the one or more attribute-value pairs includes respective links to other objects in the database;
    means for filtering the database by identifying attribute-value pairs of the first set of objects in the database that meet predefined criteria and removing the identified attribute-value pairs from the first set of objects in the database, wherein objects in the database meeting a null information criterion after the filtering comprise null objects;
    means for identifying, after the filtering, a second set of objects that include attribute-value pairs having links to null objects; and
    means for removing from the second set of objects the attribute-value pairs having links to the null objects.

11. A computer-implemented method of improving internal consistency of a database, comprising:
    at a system having one or more processors and memory storing one or more modules to be executed by the one or more processors:
    accessing a first set of objects in the database, each object including one or more attribute-value pairs, wherein at least a subset of the values in the one or more attribute-value pairs includes respective links to other objects in the database, wherein the other objects include one or more null objects having null attribute-value pairs;
    filtering the database by identifying attribute-value pairs of the first set of objects in the database that meet predefined criteria and removing the identified attribute-value pairs from the first set of objects in the database;
    identifying a second set of the attribute-value pairs of the first set of objects including links to the null objects; and
    removing from the second set of objects the attribute-value pairs having links to the null objects.

12. The computer-implemented method of claim 11, further comprising, for each of the subset of the values, inserting a name of a respective other object into the respective value.

13. The computer-implemented method of claim 11, wherein removing the links comprises removing the attribute-value pairs including the links to null objects.

14. The method of claim 1, wherein a plurality of the objects in the database, other than the null objects, include information identifying source documents for the attribute-value pairs in those objects.

15. The method of claim 11, wherein a plurality of the objects in the database, other than the null objects, include information identifying source documents for the attribute-value pairs in those objects.

16. The method of claim 1, wherein the predefined criteria include at least one criteria selected from the group consisting of database internal consistency criteria and criteria for comparing attribute value pairs with one or more blacklists.

17. The system of claim 4, wherein the predefined criteria include at least one criteria selected from the group consisting of database internal consistency criteria and criteria for comparing attribute value pairs with one or more blacklists.

18. The non-transitory computer readable storage medium of claim 7, wherein the predefined criteria include at least one criteria selected from the group consisting of database internal consistency criteria and criteria for comparing attribute value pairs with one or more blacklists.

19. The system of claim 10, wherein the predefined criteria include at least one criteria selected from the group consisting of database internal consistency criteria and criteria for comparing attribute value pairs with one or more blacklists.

20. The method of claim 11, wherein the predefined criteria include at least one criteria selected from the group consisting of database internal consistency criteria and criteria for comparing attribute value pairs with one or more blacklists.

\* \* \* \* \*